(12) United States Patent
Zhang et al.

(10) Patent No.: US 7,598,865 B2
(45) Date of Patent: Oct. 6, 2009

(54) METHOD FOR PRECISE IN-HOUSE POSITIONING

(76) Inventors: Kaicheng Zhang, IELM Department, Manufacturing Lab, The Hong Kong University of Science and Technology, Clear Water Bay, Kowloon (HK); Andrew Leong Chye Lim, IELM Department, The Hong Kong University of Science and Technology, Clear Water Bay, Kowloon (HK); Wenbin Zhu, IELM Department, Manufacturing Lab, The Hong Kong University of Science and Technology, Clear Water Bay, Kowloon (HK); Jiuqing Deng, IELM Department, Manufacturing Lab, The Hong Kong University of Science and Technology, Clear Water Bay, Kowloon (HK); Chan Hou Che, IELM Department, Manufacturing Lab, The Hong Kong University of Science and Technology, Clear Water Bay, Kowloon (HK)

( * ) Notice: Subject to any disclaimer, the term of this patent is extended or adjusted under 35 U.S.C. 154(b) by 173 days.

(21) Appl. No.: 11/459,640

(22) Filed: Jul. 24, 2006

(65) Prior Publication Data

US 2007/0109125 A1      May 17, 2007

Related U.S. Application Data

(60) Provisional application No. 60/701,868, filed on Jul. 25, 2005.

(51) Int. Cl.
*G08B 13/14*      (2006.01)

(52) U.S. Cl. ............... 340/572.1; 340/572.4; 340/539.1; 340/539.13; 340/825.49; 340/825.69; 340/10.1; 340/10.52

(58) Field of Classification Search ............... 340/572.1, 340/572.4, 539.1, 539.13, 825.49, 825.69, 340/10.1, 10.52; 235/375, 376, 383, 385; 705/22, 228, 28; 342/386, 463
See application file for complete search history.

(56) References Cited

U.S. PATENT DOCUMENTS

| | | | |
|---|---|---|---|
| 6,898,434 B2 | 5/2005 | Pradhan et al. | |
| 6,900,762 B2 | 5/2005 | Andrews et al. | |
| 6,904,000 B1 | 6/2005 | Lee | |
| 7,151,979 B2 * | 12/2006 | Andersen et al. | ............ 700/214 |

(Continued)

OTHER PUBLICATIONS

Hae Don Chon et al., "Using RFID for Accurate Positioning", Journal of Global Positioning Systems, vol. 3, No. 1-2, pp. 32-39 (2004).

(Continued)

*Primary Examiner*—Hung T. Nguyen

(57) ABSTRACT

A robust system, apparatus, and method for precise in-house positioning utilizing RFID (Radio Frequency Identification) technology are described in this invention. The in-house environment is partitioned into separate locations, and a set of RFID tags are scattered in the environment. Reading patterns of RFID tags are collected at each location by an RFID reader as samples. Pattern recognition and classification methods are used, when human, vehicle, or other carrier move around the environment with an RFID reader to estimate its physical location based on the reading pattern. The precision can be within one meter. The method is adaptive to different tag distribution, reader range, defective tags, and other physical constraints.

10 Claims, 8 Drawing Sheets

U.S. PATENT DOCUMENTS

| | | | |
|---|---|---|---|
| 7,155,304 B1 * | 12/2006 | Charych | 700/214 |
| 7,336,152 B2 * | 2/2008 | Horwitz et al. | 340/10.1 |
| 2005/0052281 A1 * | 3/2005 | Bann | 340/539.13 |
| 2006/0170565 A1 * | 8/2006 | Husak et al. | 340/825.49 |

OTHER PUBLICATIONS

Jurgen Bohn et al., "Super-Distributed RFID Tag Infrastructures", $2^{nd}$ European Symposium on Ambient Intelligence (EUSAI 2004).

* cited by examiner

METHOD FOR PRECISE IN-HOUSE POSITIONING

CROSS-REFERENCE TO RELATED APPLICATIONS

This application claims the benefit of priority from previously filed provisional application entitled "Robust RFID-Based Method for Precise In-House Positioning," filed on Jul. 25, 2005, with Ser. No. 60/701,868, and the entire disclosure of which is herein incorporated by reference.

BACKGROUND

1. Field of the Invention

The invention relates to a method and apparatus for location identification and positioning. In particular, the invention relates to a method, apparatus, and system for determining the position of an RFID reading device when it moves around within a region based on reading patterns of the RFID tags dispersed throughout the region.

2. Description of Related Art

Positioning and location identification information is useful in a number of industrial fields. In logistics and transportation domain, for example, the capability to identify the position of each cargo, carrier, vehicle, and even human in real-time provides visibility to the whole supply chain.

Global Positioning System ("GPS") has frequently been used to determine the position of a user around the globe. However, a GPS receiver requires a good view of the sky at all times. When it comes to indoor applications, GPS is not reliable solution due to the poor reception of satellite signals. In addition, for in-house applications, the required precision, sometimes as high as within one meter, is higher than that of the outdoor applications. GPS apparatus with higher precision comes at a higher price. Therefore, using precise GPS for local in-house positioning is not an economical solution.

Most of the existing Indoor Positioning Systems ("IPS") are based on Wireless Local Area Network ("WLAN") for which wireless access points are installed in each room and a portable receiving device can determine which room the device is in when it receives signals from installed access points. However the precision of this type of systems is not high enough for logistics applications. Furthermore, there will be problems if any of the access points fails to work.

Within a warehouse, a cargo terminal, or a truck depot, it is often desirable to know the position of each vehicle, and to give it the correct instruction for picking up or dropping off cargos at a certain location. Incorrect instructions and misplacements could be very costly, leading to wrong delivery, inadequate supply, customer dissatisfaction, and finally lost revenues. Thus there is a need for a robust method, system and apparatus for precise indoor positioning at a reasonable cost.

SUMMARY

A robust method for precise in-house positioning utilizing Radio Frequency Identification ("RFID") technology is presented. The in-house environment is partitioned into separate locations, as small as within one square meter per location. A set of RFID tags is distributed in the environment. Sample readings of RFID tags are first collected when RFID antenna and reader are placed at each location. Each reading will include a set of tags that could be read by the RFID reader. A self-validation process is initiated to test whether the differences among reading samples at different locations are sufficient. If not, more tags are put into the environment to generate the required difference. The set-up process is complete when there is sufficient difference among samples read at different locations A later user or vehicle carrying a mobile RFID reader moves about in the environment; the real-time reading results are processed and compared to the sample readings and classified to one of the locations using our pattern recognition and classification algorithms running on a computer. For example, in one implementation the computer could be a single PC carried along by the user, or a centralized server which receives results from different mobile readers and computes the location to send back to the client through a wireless network in another implementation. In addition, if the effective RFID field of the antenna is not concentric, for one location, reading samples when vehicle facing different directions are also recorded so that later the direction could also be determined.

A typical practical application of the present invention is a self-positioning forklift in a warehouse. In the warehouse management system, the cargo at each location in the warehouse is recorded and maintained. Before the receiving process, some empty locations are assigned to the incoming cargos. Forklifts are commanded to move received cargos and to place them into the designated locations. By using the present positioning system, the warehouse management system can assign location for each cargo at real-time, and send the command to the forklift; the forklift, which carries a RFID reader, repeatedly reads RFID tags in the environment and calculates its location. The movement of the forklift is monitored by the warehouse management system to check against the receiving plan at real-time. If the forklift goes to the wrong location, a warning message will be sent to the driver by the system. Thus, the picking accuracy is improved. The warehouse space utilization is also improved because there will be no more need to put cargos of same batch together as we can assign location for incoming cargo on the go, with the real-time information of the warehouse.

Compared to the existing system, the present invention has several improvements and advantages:

1. It is a more precise solution.

As the density of the distributed tags in the environment is higher, more precise positioning is achieved. Previous methods locate user to a room inside a building, present invention locates user to a unit location as small as less than one square meter.

2. It is a lower cost solution.

In the present invention the requirements on RFID tags are low. No battery-support active RFID tags are required. Also no information of RF signal strength scattered back by the tags is required.

3. The invention can tolerate environmental noise and tag failure(s).

In the environment there always can be noise and obstacles which affect the reading of RFID tags. Also some tags may fail. However, in the present invention as the density of distributed tags is higher, the difference of sample reading at each location is sufficiently large. The system could still function under noise and tag failure.

4. It could also provide carrier orientation information.

When RFID antenna is not a concentric shape (like a circle), the RF field it generates differs when the antenna is rotated on the same plane. Thus the reading of the vehicle carrying the antenna is different when the vehicle is facing different direction. By compare the reading with sample readings at each direction, we would know the orientation of the carrier.

A more complete understanding of the present invention will be apparent from the following Detailed Description and the accompanying drawings.

BRIEF DESCRIPTION OF THE DRAWINGS

Like reference numbers and designations in the different figures indicate like elements.

DETAILED DESCRIPTION

RFID technology is a well-known technology which can be implemented for finding accurate locational information of objects which need to be tracked in an in-house environment. This invention employs a "super-distributed tag infrastructure" to distribute large tag sets in environment, and the distribution need not be uniform. Furthermore, each reading returns data from a set of tags, instead of only one tag, to make this a very robust deployment. Finally, the location information is determined by the reading set.

Figure 1:
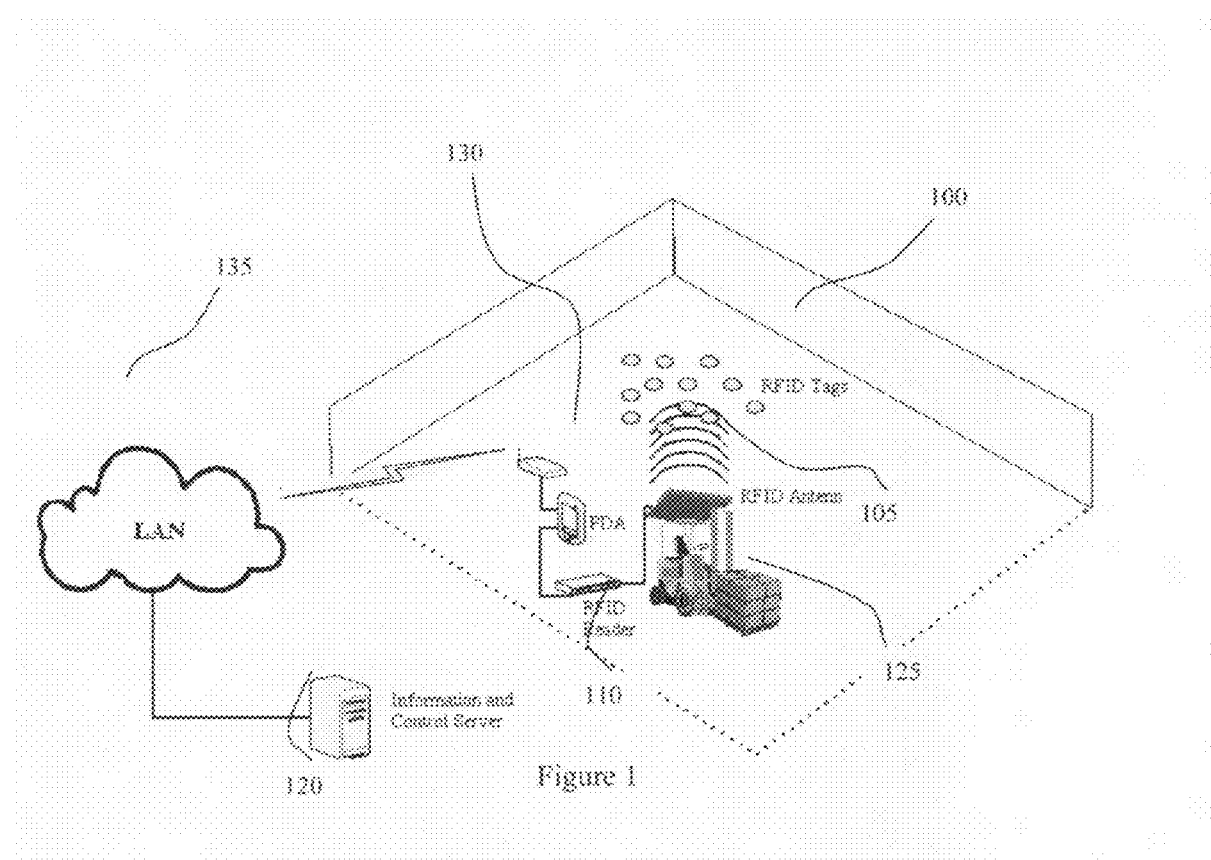
FIG. 1 illustrates an overview of an indoor positioning system implemented according to the present invention.

Referring to FIG. 1, a system implemented according to the principles of this invention can consist, for example, a set of RFID tags 100. The reading can be collected by antenna 105, which is carried in vehicle 125. RFID reader 110 collects the reading set, which, in one implementation, is transmitted to control server 120 through the wireless LAN 135 via an access point serving PDA 130. Here, RFID reader 110 can in one implementation be Symbol XR400 RFID Fixed Reader. Similarly, antenna 105 can in one implementation be Symbol High-Performance Area Antenna. The details of both are available at http://www.symbol.com.

Figure 2:
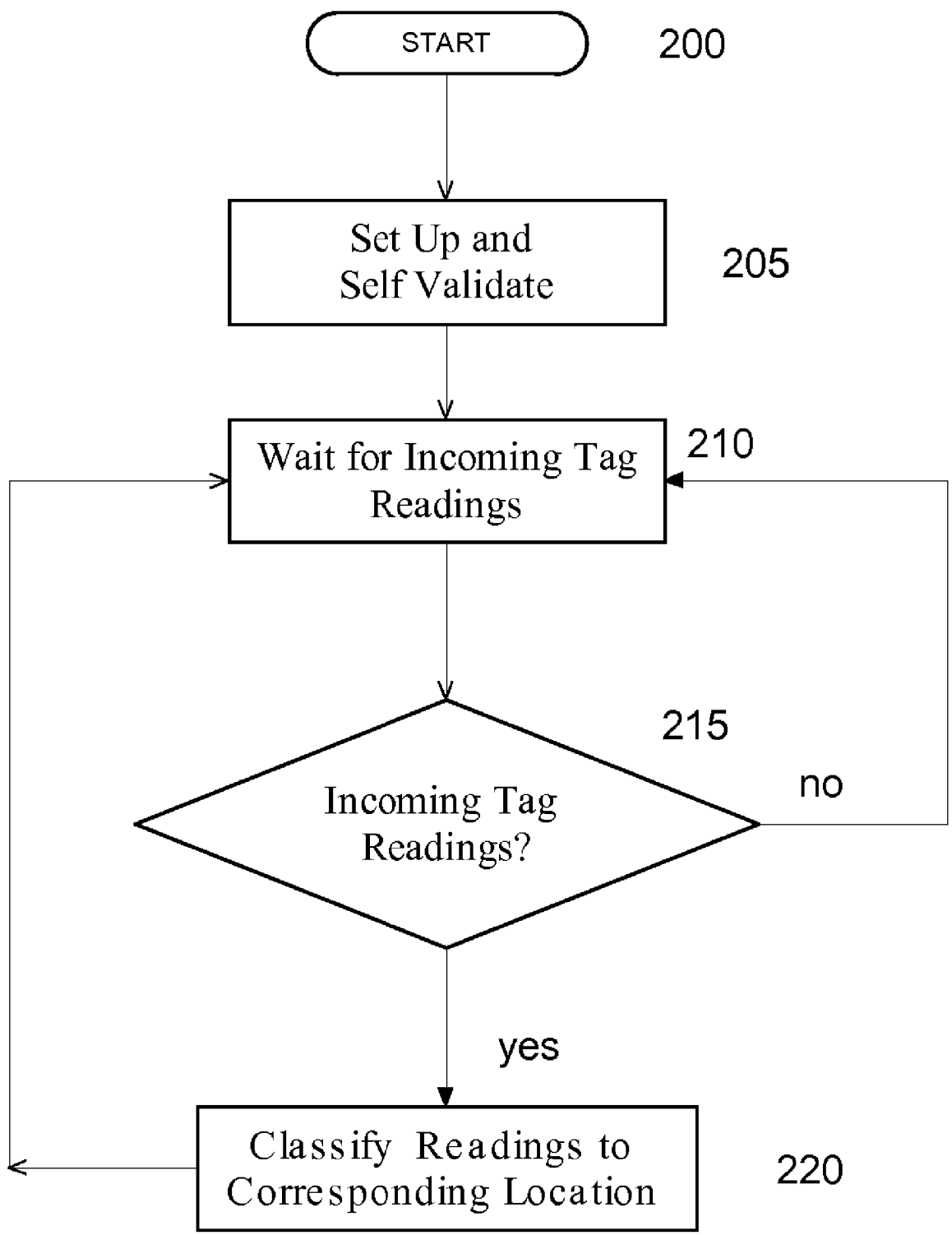
FIG. 2 is flow diagram of the steps for locating the indoor position of a target object according to the present invention.

FIG. 2 illustrates the overview of the process for location determination according to the present invention. The system starts (200) by performing system set-up and self-validation procedures (205). After the system is successfully set up, it waits (210) for incoming tag readings. If the system detects incoming tag readings (215), it will match the readings to a corresponding location in the environment (220), after which step the system again waits for incoming tag reading.

Figure 3:
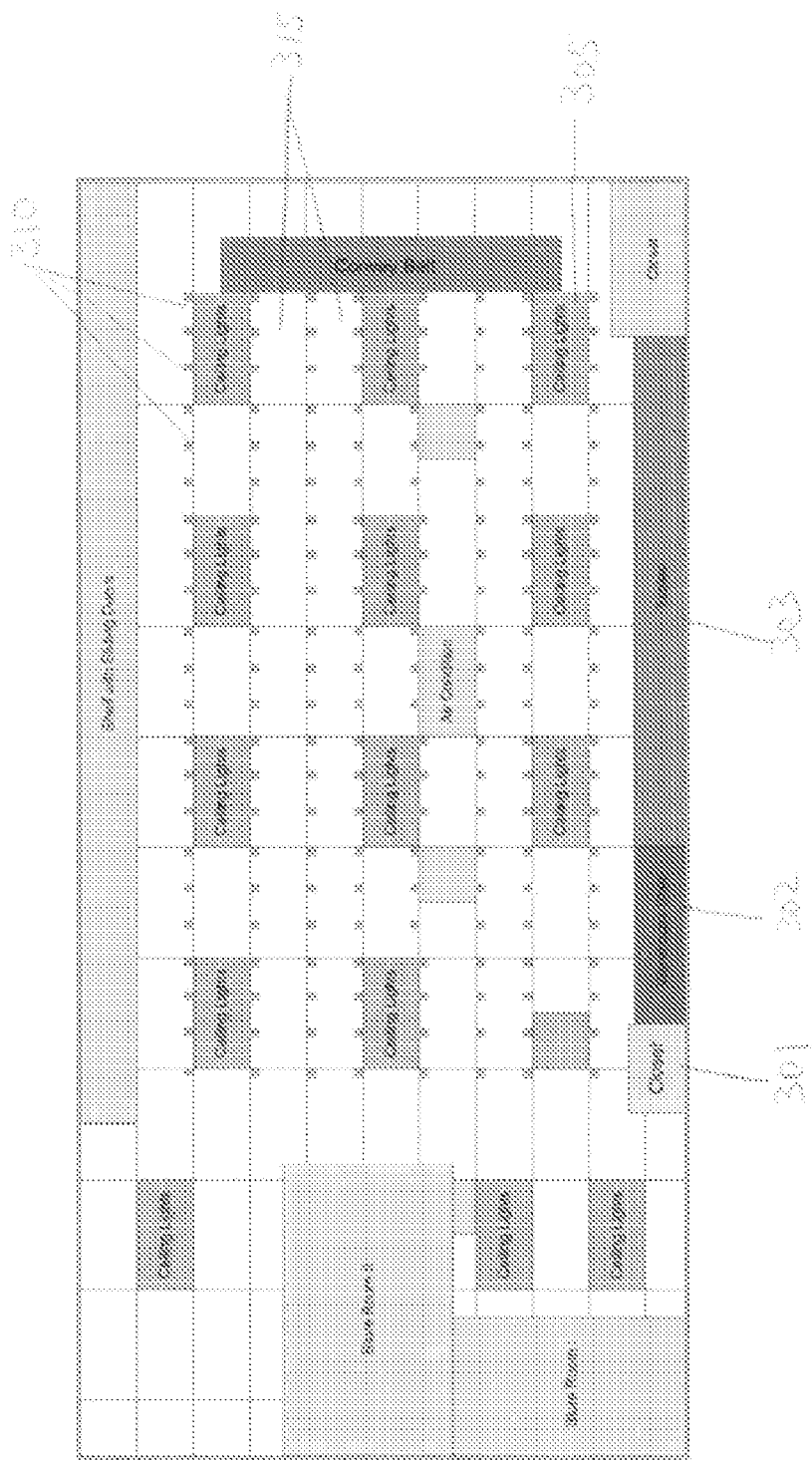
FIG. 3 illustrates the setup of the RFID tags in accordance with the present invention.

FIG. 3 illustrates a sample diagram of RFID tags distributed in the environment. The environment may have a variety of furniture and room arrangements, such as closet 301, shelf 302, and tables 303. The room also has a plurality of ceiling lights 305. The environment is first partitioned into small locations; the fineness of the partition can vary with the desired level of precision for the location information. In FIG. 3, for example, the environment is divided into 7 rows by 7 columns unit locations; each location 315, for example, can be of size 1.20 meters by 0.60 meter. A number of RFID tags, such as 176 Symbol UHF RFID tag RFX3000 3×3 carton tags, as represented by dots 310 in FIG. 3, are distributed generally uniformly on the 2.22-meter high ceiling of the area. Some tags may deviate from its suggested position a bit due to physical limitation of the environment. The tags 310 are distributed uniformly in this example but uniformity is not always required. Generally any UHF RFID tag (including EPC class 0 or 1 or 2) can be used to implement the system and method of this invention. Note that there are commonly lights, air-conditioners, and other objects in the ceiling, essentially generating noise to RF communications and simulating a quasi-industrial environment.

Normally the tags will be put on the ceiling or on the floor in the indoor environment. However, in other implementations the tags can be scattered on the floor, walls, or the pillars. Furthermore, the distribution of the tags can be uniform, but uniformity is not required. In a real industrial environment, there will always be obstacles and noises that absorb or reflex radio waves, resulting in poor or unstable readings of RFID tags. Therefore, it is important to disperse a large number of tags and to collect reading from a group of tags at each location to overcome the noise problem. Note that the tags can be distributed randomly over the area. The effectiveness of the tag distribution is determined by a self-validation process as detailed in FIG. 4.

Figure 4:
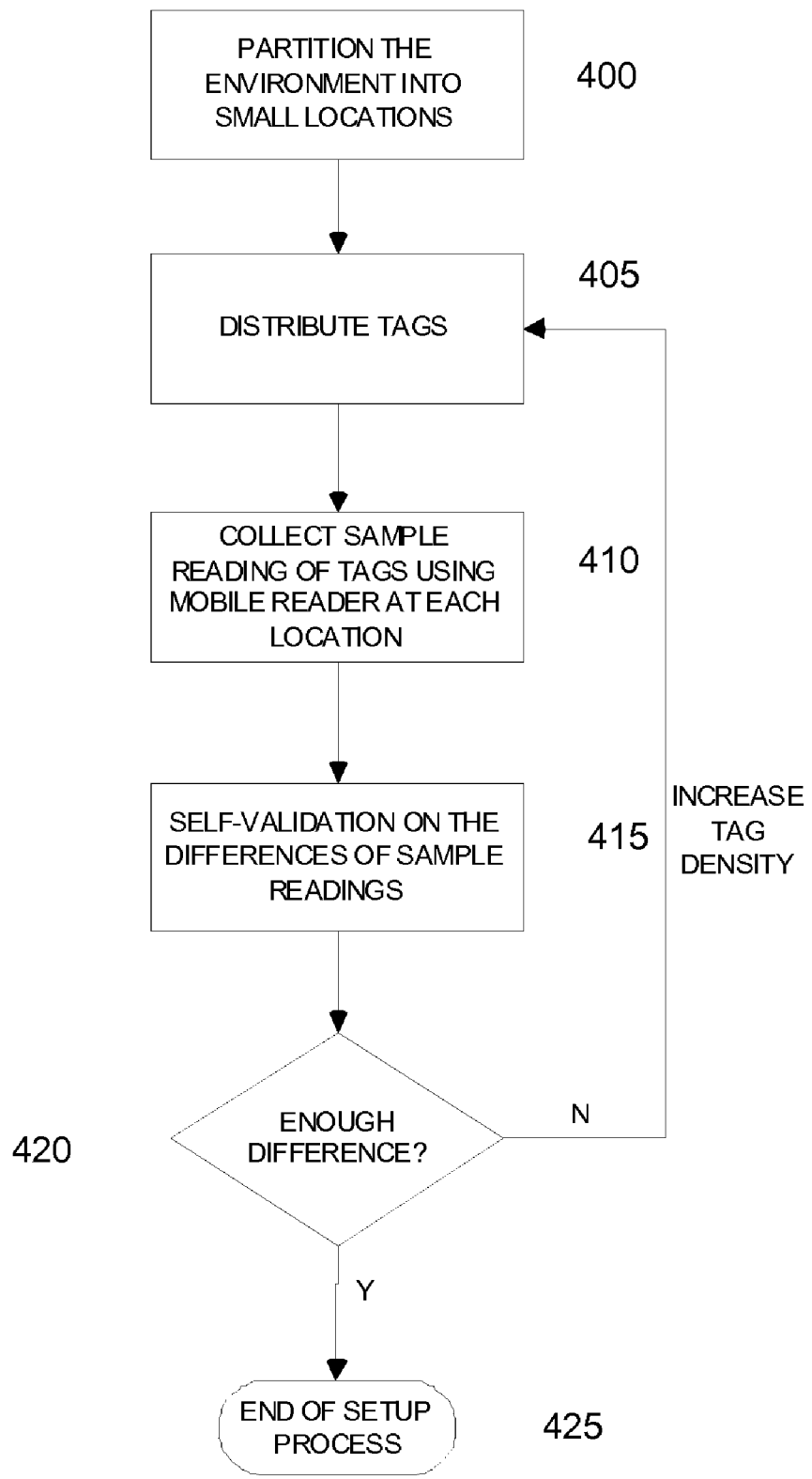
FIG. 4 is the flow diagram of initial set up and validation process.

Referring to FIG. 4, a self-validation process is employed to test whether the RFID tag density at each location in the environment is high enough so that the reading at different location can be differentiated. For the self-validation process one set of antenna and RFID reader, such as antenna 105 and reader 110 of FIG. 1, is taken to each location to take sample readings. This set of antenna and RFID reader can be removed later and placed on the mobile unit to take real-time readings. The reader will read the RFID tags in its effective area for a number of cycles. Each read is a set of tag id, which is an alphanumeric string that uniquely identifies an RFID tag. All the tags the reader reads would be unified together as the sample reading set at a location.

The process starts by partitioning (400) the environment into small locations, such as location 315 in FIG. 3. Tags are distributed (405) within the plurality of locations. Sample readings of tags using mobile reader is taken (410) at each location. Self-validation of 415 starts by take reading of some single cycle at each location as an observed reading, compare it with all the sample readings including itself, and classify it to one of the locations using our pattern recognition and classification methods to be described later. The result location is checked with the sample reading's true location. A preliminary accuracy of the whole positioning system can be estimated by the number of correctly classified location over the total number of locations. If there are many wrong classifications, the tagging density is considered to be too low, and more tags will be scattered in the environment. For a single location, the sample readings in that location is compared with the sample readings at adjacent locations to see whether there are enough difference (420). The "similarity" of the two readings is defined and described later in the present invention. If at a certain point, due to tag malfunctions, low tag density, or poor environment, the similarity is too high comparing with the adjacent points, more tags need to be dispersed around that point to fix the problem. The self-validation process is repeated until the accuracy is satisfactory. In this way, the overall performance of the whole system as well as the performance at some special points is guaranteed.

After passing the self-validation step, the RFID tag density is considered to be sufficient. Sample reading set of RFID tags at each location is recorded into computer or a local server or the like. In one implementation of the invention, only a set of tag id's at each location is stored. No additional information, such as signal strength or signal direction of the RFID tags is needed; nor is location information of each RFID tag required. This reading collection and storing process could be repeated if the hardware setup of the mobile agent is changed.

Figure 5:
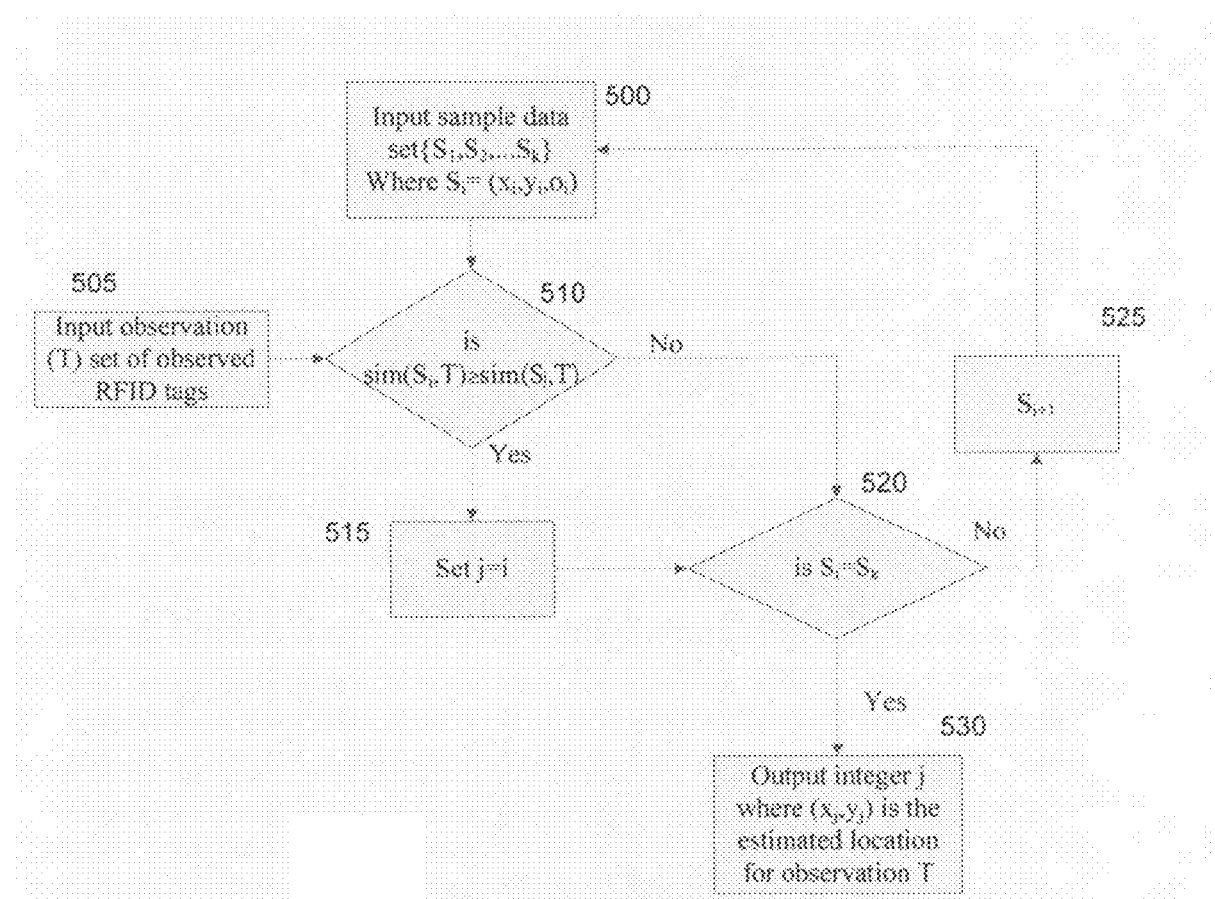
FIG. 5 is a sample location-matching method.
Figure 6:
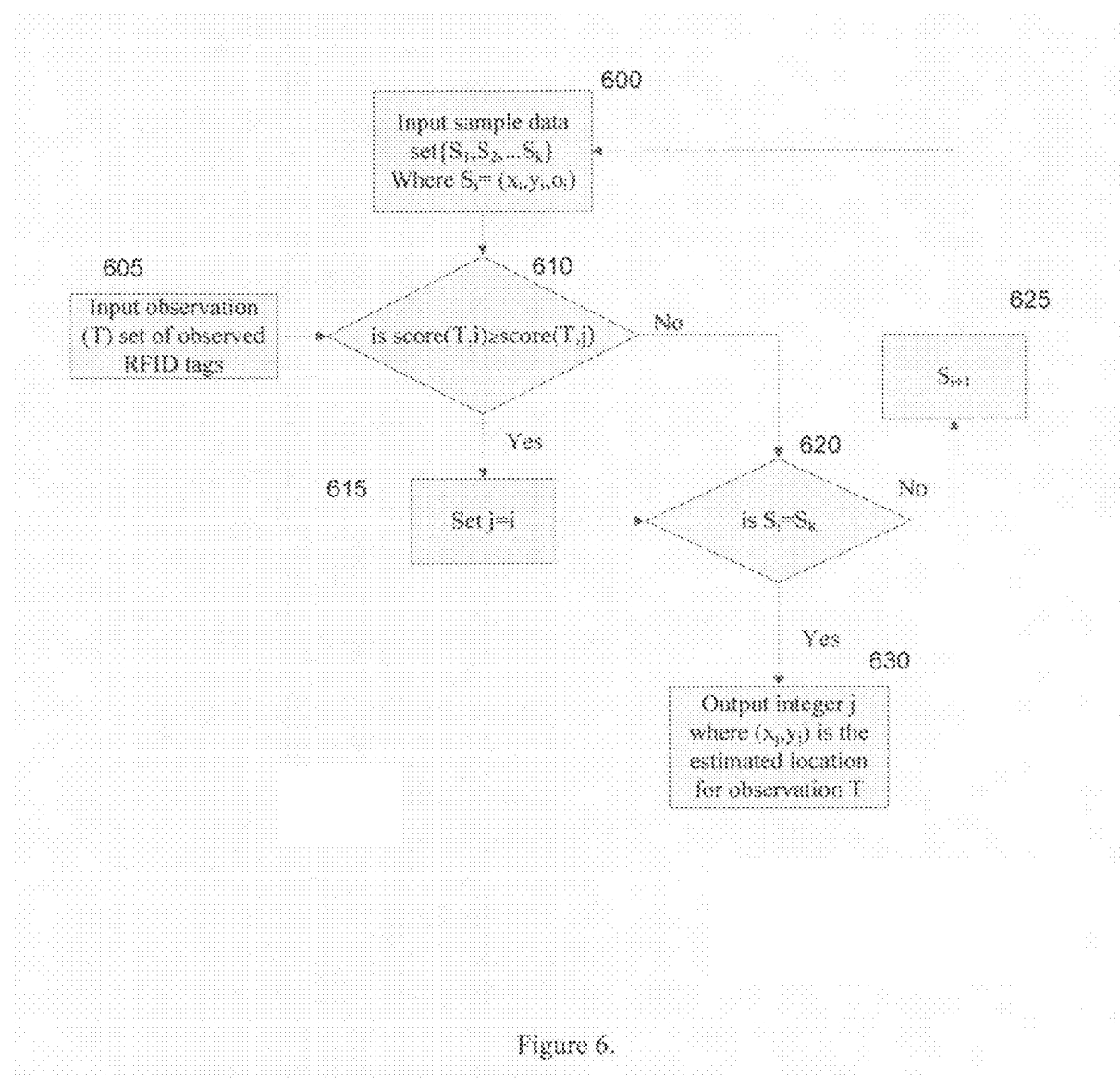
FIG. 6 is an alternative location-matching method.

FIG. 5 and FIG. 6 describe the details of two classification methods. Given a set of tags read by RFID reader at a location, the position of the mobile unit/vehicle can be determined using the following two algorithms:

"Intersection Over Union" Algorithm

FIG. 5 describes this algorithm. Basically this algorithm will compare the observed tag set against each sample set, which is collected and recorded at the setup stage, and try to find to which sample set the observed set is most "similar". The location of the vehicle would be considered the same as where the most similar sample set is collected.

Input 500 is a sample data set $\{S_1, S_2, \ldots S_k\}$ for k locations

Where $S_i=(x_i, y_i, o_i)$ is the sample data at the ith sample point $x_i$ the x coordinate of the ith sample point $y_i$ the x coordinate of the ith sample point $o_i$ the set of observed RFID tag ids (normally a 96-bit string) at ith sample point An observation T 505 consists of the set of observed RFID tag ids (normally a 96-bit string) at some location.

The method defines similarity of a sample observation set and a random observation set as follows:

$$Sim(S_i, T) = \frac{|Si \cap T|}{|Si \cup T|}$$

For each $1 \leq i \leq n$, compute the "similarity" between Si and T as follows Choose j such that $Sim(Sj,T) \geq Sim(Si,T)$ for all $1 \leq i \leq k$ Eg. $Sim(S_j,T)=|\{'b','c','d'\}|/|\{'a','b','c','d','g'\}|=3/5=0.6$, For $S_j=\{'b','c','d'\}$, $T=\{'a','b','c','d','g'\}$ and 'a','b','c', 'd','g' are tag strings.

As outlined in steps 510, 515, 520, 525. The output (530) is an integer j, $1<=j<=k$, where $(x_j, y_j)$ is the estimated location for observation T. The 96-bit string is used here only as an illustration for one standard length under RFID EPC Standards. Other types of RFID tags, with unique ID of various lengths and formats according to other standards, may also be used.

"Tag-to-Location Mapping Count" Algorithm

Intuitively, for each tag in an observation, we count all the possible positions in sample data in which the tag is perceived. The position that has most count will be considered as solution.

Input 100 consists of a sample data set $\{S_1, S_2, \ldots S_k\}$ for k locations, Where $S_i=(x_i, y_i, o_i)$ is the sample data at the ith sample point $x_i$ the x coordinate of the ith sample point $y_i$ the x coordinate of the ith sample point $o_i$ the set of observed RFID tag ids (normally a 96-bit string) at ith sample point An observation T consists (605) a set of observed RFID tag ids (normally a 96-bit string) at some location.

Output (630) an integer j, $1<=j<=k$, where $(x_j, y_j)$ is the estimated location for observation T, by defining tag-to-location mapping, a mapping from tag-id is to a set of integers, which are the indices of the tag's associated sample points $$TTL(s)=\{p | \text{ where } s \in o_p\}$$

then define the score at each sample point $(x_i, y_i)$, given the observation T $$score(T, i) = \sum_{s \in T} \left( \begin{cases} 0, & \text{if } i \notin TTL(s) \\ 1, & \text{if } i \in TTL(s) \end{cases} \right), \text{ for all } i$$

And finally choose j such that $score(T, j)>=score(T, i)$ for all $1<=i<=k$ (steps 610, 615, 620, 625).

Again, the 96-bit string is used here only as an illustration for one standard length under RFID EPC Standards. Other types of RFID tags, with unique ID of various lengths and formats according to other standards, may also be used.

Simulated experiments were carried out in our setup environment. Two set of sampling reads are collected at Table 1 and Table 2. One is at each unit location, thus having 7×7 sampling reads. Another one is at each and half unit location, thus having 15×14 sampling reads. For each sampling set, we place the vehicle in each of the sample location and get a number of reads; we classify the reads against the sample reads using the two algorithms. The accuracy of two algorithms are presented as follows:

TABLE 1

| Sample Data | Unit Location Size | Test Points | "Insertion over Union" Errors | Accuracy | Tag-to-Location Mapping Count Errors | Accuracy |
| --- | --- | --- | --- | --- | --- | --- |
| 7 × 7 | 1.2 m × 0.6 m | 250 | 3 | 98.8% | 1 | 99.6% |
| 15 × 14 | 0.6 m × 0.3 m | 1210 | 43 | 96.45% | 72 | 94.05% |

To illustrate the identification of orientation in addition to location, we make one set of sampling reads collected at 7×7 locations, with the vehicle facing front, and facing side (turn 90 degrees). The accuracy is presented as follows:

TABLE 2

| | Test Case | |
| --- | --- | --- |
| Sample Data | 7 × 7_std Correct (out of 490) | 7 × 7_side Correct (out of 490) |
| 7 × 7_std_side_mix | 478 (97.55) | 483 (98.57%) |

From experimental results, it can be observe that the present invention could tell the correct location of the carrier in the environment to over 95% accuracy. Provided that the tag density is high enough, our set up and method achieve a positioning precision of 1 meter, which is particularly favorable for indoor logistics applications, where most of the SKU (Stock Keeping Units) are of dimensions about 1 meter by 1 meter by 1 meter. The present invention can also identify the orientation, or direction, of the carrier. Generally, higher tag density and higher tag sampling rate would produce better results with our classification algorithms. The constraint relation between density of sampling, density of tagging, and classification accuracy is dependant on the physical environment and should be fine tuned to achieve best results.

Figure 7:
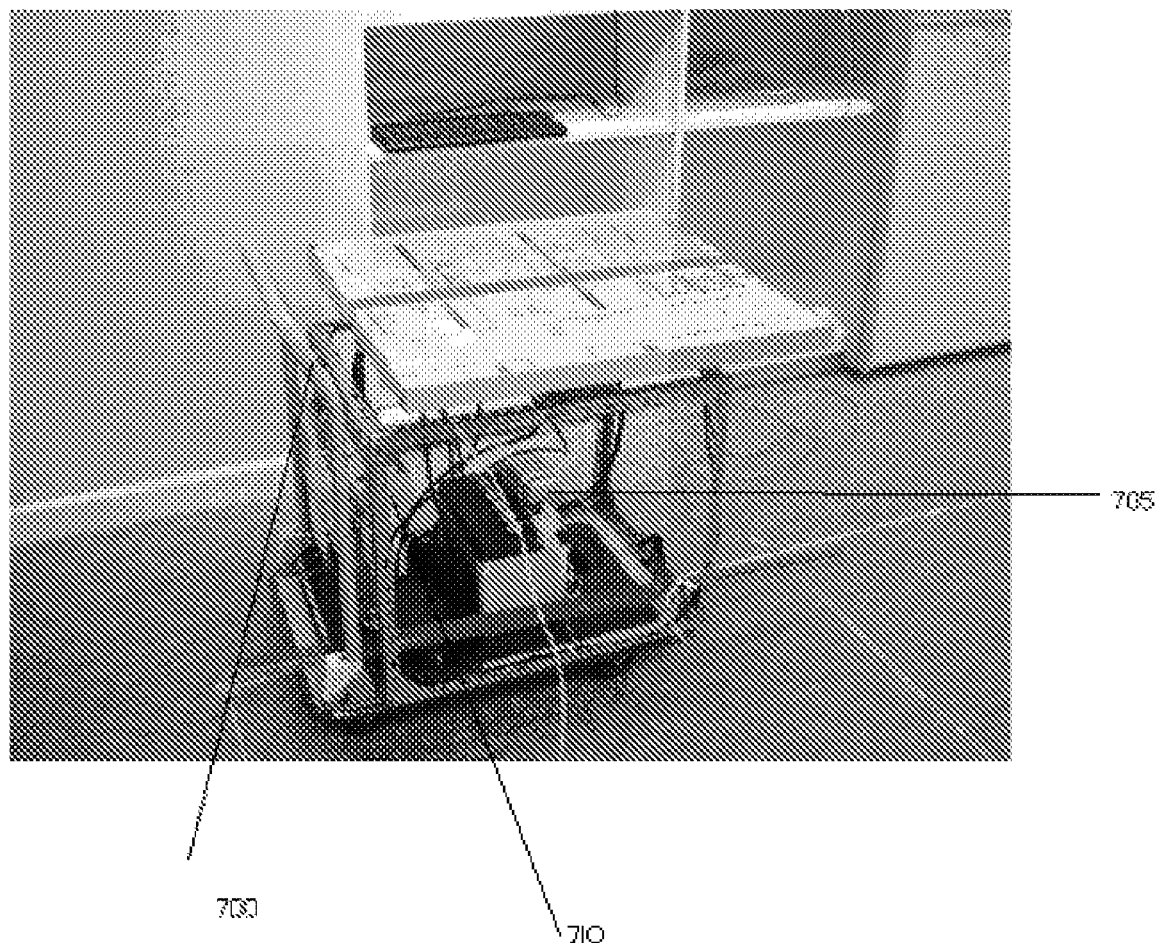
FIG. 7 illustrates a sample RFID mobile reader and antenna carrier implemented according to the present invention.

FIG. 7 illustrates a sample setup of a mobile vehicle 700 carrying a vertically-mounted mobile RFID reader 710 and antenna 705 in accordance with present invention. There can be one or more antennas in one implementation. A personal computer (not shown) is connected to reader 710 using network cable, which collects the reading results from reader 710. The network cable could also be replaced by wireless network communication. The reader 710 repeatedly reads RFID tags when the vehicle moves around, and sends results to the computer.

Figure 8:
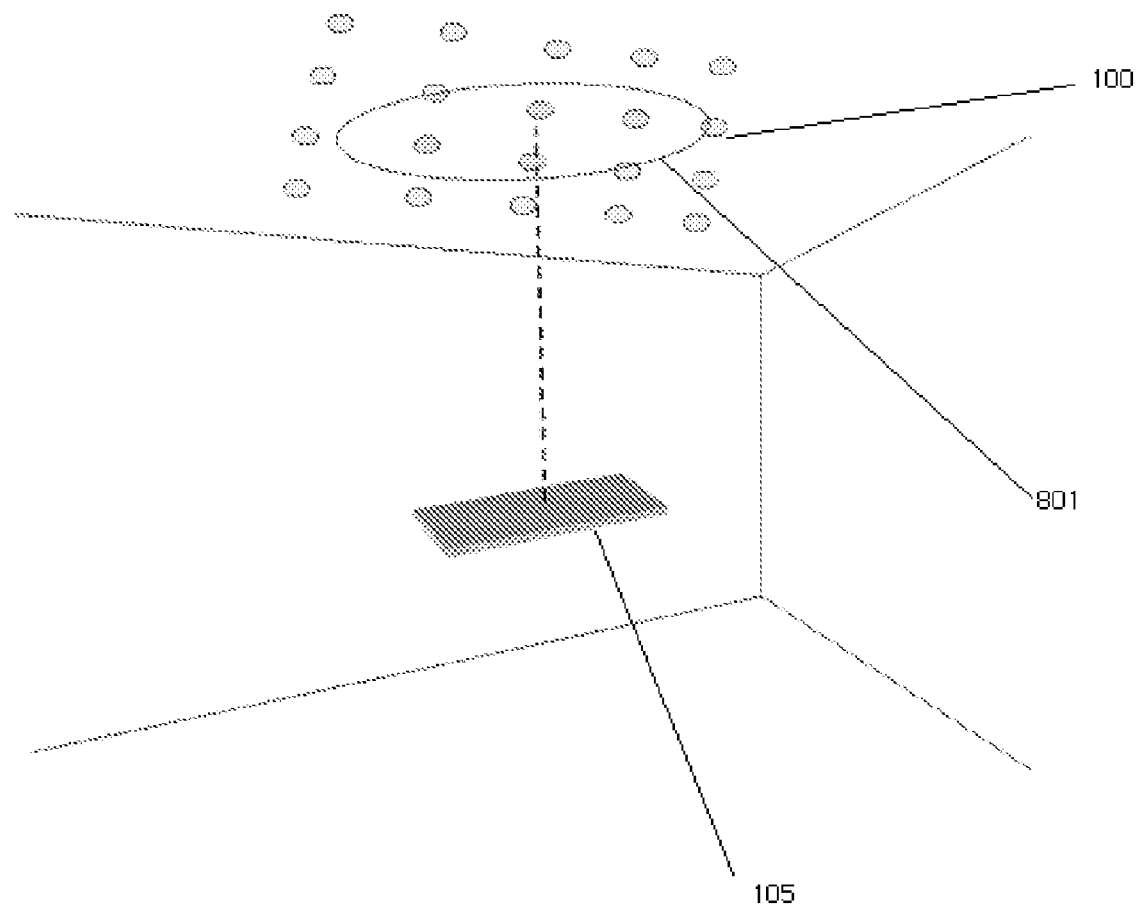
FIG. 8 illustrates a non-concentric RFID antenna positioned indoor for reading a set of RFID tags in the environment.

FIG. 8 illustrates an RFID antenna's 105 effective zone 801 and the set of tags 100 it read in the environment (support for antenna 105 is not shown in the drawing). Note that when the vehicle is facing different direction at same location, the antenna could have different effective zone, thus having different reading set. Therefore we could also know, in addition to the location of the vehicle, the information of the orientation or direction of the vehicle.

Besides the invention being an indoor positioning with high accuracy. It also comes at a relative low cost. The low requirement on RFID tag (passive, no signal strength information) significantly reduced the cost compared with existing technology. In addition, because of the fact that the location of the mobile agent is determined by reading multiple tags instead of one tag, the present invention is robust for industrial use. It could handle not only single tag failures, temporary environmental disturbance to RF, the sample reading collecting and storing process could always adapt to errors introduced by different setups of mobile agents and RFID readers.

The foregoing description of the invention has been presented for purposes of illustration and description. It is not intended to be exhaustive or to limit the invention to the precise embodiments disclosed. For example, while the present invention is disclosed in the context of a positioning system for vehicles in warehouse management process, it could also be implemented and employed by many other ways in different areas. The use of the present invention could be further extended to determine the precise real-time position of human, assets, and other object utilizing the method and technique disclosed in the present invention. When implemented in software, the elements of the present invention are essentially the code segments to perform the necessary tasks. The program or code segments can be stored in a processor readable medium or transmitted by a computer data signal embodied in a carrier wave over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Those skilled in the art will readily observe that numerous modifications and alterations of the device may be made without departing from the scope, spirit or teachings of the invention. The invention is defined by the following claims and their equivalents:

We claim:

1. A method for locating a moving object in an in-door environment, comprising: receiving signals from a plurality of radio frequency identification (RFID) tags, wherein each of the plurality of RFID tags has an associated identification information transmitted in the signals and the plurality of tags is randomly scattered in the in-door environment with a distribution density determined by a validation process and high enough to distinguish the in-door environment into a plurality of locations; and matching a set of associated identification information in the received signals with a set of stored location map to select one location from the plurality of locations for the moving object; wherein the moving object carrying an RFID antenna and an RFID reader for receiving signals from the plurality of RFID elements and the plurality of RFID elements being only capable of transmitting signals up to a certain distance.

2. The method of claim 1, further comprising determining an orientation of the moving object.

3. The method of claim 1, wherein the plurality of the RFID tags is scattered in the ceiling of the in-door environment.

4. The method of claim 1, wherein the matching step further comprises computing $$Sim(S_i, T) = \frac{|Si \cap T|}{|Si \cup T|} \text{ so } Sim(Sj, T) \geq Sim(Si, T) \text{ for all } 1 \leq i \leq k$$

where $\{S_1, S_2, \ldots S_k\}$ being for k locations in the in-door environment and T comprises a set of associated identification information in the received signals.

5. The method of claim 1, wherein the matching step further comprises counting all possible locations for each tag from the plurality of RFID tags in the received signals and choosing a location with a maximum number of counts.

6. A method for locating a moving object in an in door environment, comprising:
   receiving signals from a plurality of radio frequency identification (RFID) tags, wherein each of the plurality of RFID tags has an associated identification information transmitted in the signals and the plurality of tags is scattered in the in-door environment with a distribution density high enough to distinguish the in-door environment into a plurality of locations; and
   matching a set of associated identification information in the received signals with a set of stored location map to select one location from the plurality of locations for the moving object;
   wherein the moving object carrying an RFID antenna and an RFID reader for receiving signals from the plurality of RFID elements and the plurality of RFID elements being only capable of transmitting signals up to a certain distance, and wherein the matching step comprises computing $$Sim(S_i, T) = \frac{|Si \cap T|}{|Si \cup T|} \text{ so } Sim(Sj, T) \geq Sim(Si, T) \text{ for all } 1 \leq i \leq k$$

where $\{S_1, S_2, \ldots S_k\}$ being for k locations in the in-door environment and T comprises a set of associated identification information in the received signals.

7. The method of claim 6, wherein the matching step further comprises counting all possible locations for each tag from the plurality of RFID tags in the received signals and choosing a location with a maximum number of counts.

8. The method of claim 6, wherein the associated identification information of each of the plurality of RFID tags consists of a 96-bit string.

9. The method of claim 6, wherein the selected one location for the moving object further comprises an orientation of the moving object.

10. The method of claim 6, wherein the plurality of the RFID tags are scattered in the ceiling of the in-door environment.

* * * * *